(12) United States Patent
Yoon et al.

(10) Patent No.: US 11,716,452 B2
(45) Date of Patent: *Aug. 1, 2023

(54) IMAGE PROJECTING APPARATUS AND CONTROLLING METHOD THEREOF

(71) Applicant: SAMSUNG ELECTRONICS CO., LTD., Suwon-si (KR)

(72) Inventors: Seungil Yoon, Suwon-si (KR); Joonhyun Yang, Suwon-si (KR); Eunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,479

(22) Filed: Apr. 20, 2022

(65) Prior Publication Data

US 2022/0247986 A1 Aug. 4, 2022

Related U.S. Application Data

(63) Continuation of application No. 17/183,808, filed on Feb. 24, 2021, now Pat. No. 11,336,878.

(30) Foreign Application Priority Data

Apr. 2, 2020 (KR) .................. 10-2020-0040282

(51) Int. Cl.
*H04N 9/31* (2006.01)
*G06T 7/50* (2017.01)

(52) U.S. Cl.
CPC .............. *H04N 9/3185* (2013.01); *G06T 7/50* (2017.01); *H04N 9/3191* (2013.01)

(58) Field of Classification Search
CPC ....... H04N 9/3185; H04N 9/3191; G06T 7/50
See application file for complete search history.

(56) References Cited

U.S. PATENT DOCUMENTS 7,036,940 B2 5/2006 Matsuda et al.
7,131,732 B2 * 11/2006 Inoue ................... H04N 9/3185
353/69

(Continued)

FOREIGN PATENT DOCUMENTS

JP 4867154 2/2012
JP 2013-168922 8/2013

(Continued)

OTHER PUBLICATIONS

International Search Report and Written Opinion dated Jun. 21, 2021 in corresponding International Application No. PCT/KR2021/002783.

(Continued)

*Primary Examiner* — Brian P Yenke
(74) *Attorney, Agent, or Firm* — Nixon & Vanderhye, PC

(57) ABSTRACT

An image projecting apparatus including an optical output unit for projecting and image, a camera, a plurality of sensors, and a processor is disclosed. The processor is configured to identify, based on sensing data received through the plurality of sensors, a distance between each of the plurality of sensors and a projection surface, provide, based on a difference between the identified distances being greater than or equal to a pre-set threshold value, a user interface configured to guide a direction adjustment of the image projecting apparatus, and identify, based on a difference between the identified distances being less than the pre-set threshold value, a shape of a projected image by photographing an image projected to the projection surface through the camera, and control the optical output unit to project an image corrected based on the identified shape.

16 Claims, 8 Drawing Sheets

(56) References Cited

U.S. PATENT DOCUMENTS

| | | | |
|---|---|---|---|
| 7,600,875 B2* | 10/2009 | Inoue | G03B 21/147 353/69 |
| 8,322,863 B1* | 12/2012 | Cho | H04N 9/3185 353/70 |
| 9,344,695 B2 | 5/2016 | Shibata et al. | |
| 9,357,190 B2 | 5/2016 | Chang | |
| 9,621,820 B2 | 4/2017 | Ehara | |
| 9,654,750 B2 | 5/2017 | Kunieda | |
| 10,402,938 B1 | 9/2019 | Newman | |
| 10,979,682 B2 | 4/2021 | Ichieda | |
| 2004/0252283 A1* | 12/2004 | Ogawa | H04N 9/3185 353/69 |
| 2005/0030523 A1* | 2/2005 | Inoue | G01S 17/87 356/139.1 |
| 2005/0046804 A1* | 3/2005 | Akutsu | H04N 9/3194 353/70 |
| 2005/0062939 A1* | 3/2005 | Tamura | H04N 5/7416 353/69 |
| 2006/0256299 A1 | 11/2006 | Saito | |
| 2007/0071430 A1* | 3/2007 | Iwanaga | G01C 3/10 396/114 |
| 2007/0071431 A1* | 3/2007 | Inoue | H04N 9/3185 396/116 |
| 2010/0079468 A1 | 4/2010 | Pance | |
| 2010/0103386 A1* | 4/2010 | Kubota | H04N 9/3185 353/121 |
| 2011/0151926 A1 | 6/2011 | Kim | |
| 2011/0234817 A1 | 9/2011 | Sakamoto | |
| 2012/0105813 A1 | 5/2012 | Todoroki | |
| 2013/0063401 A1* | 3/2013 | Ouchida | H04N 9/3179 345/175 |
| 2013/0155176 A1 | 6/2013 | Paripally et al. | |
| 2013/0286361 A1 | 10/2013 | Vasquez | |
| 2014/0028886 A1 | 1/2014 | Wang | |
| 2014/0176730 A1 | 6/2014 | Kaji | |
| 2014/0285778 A1 | 9/2014 | Inoue et al. | |
| 2014/0340529 A1 | 11/2014 | Shibata et al. | |
| 2015/0015852 A1 | 1/2015 | Furui | |
| 2015/0146047 A1 | 5/2015 | Ehara | |
| 2015/0195517 A1* | 7/2015 | Brown | H04N 9/3194 348/189 |
| 2016/0156890 A1 | 6/2016 | Yoshimura | |
| 2016/0249027 A1 | 8/2016 | Jurik | |
| 2016/0286184 A1 | 9/2016 | Liu | |
| 2016/0316184 A1* | 10/2016 | Kim | H04N 9/3161 |
| 2017/0041580 A1* | 2/2017 | Ohira | H04N 9/3147 |
| 2017/0094238 A1 | 3/2017 | Germaine | |
| 2018/0160041 A1 | 6/2018 | Price | |
| 2021/0227188 A1 | 7/2021 | Aoki | |
| 2021/0294455 A1* | 9/2021 | Kang | H04N 21/4223 |
| 2022/0078385 A1* | 3/2022 | Yeung | H04N 9/3194 |
| 2022/0201262 A1* | 6/2022 | Chen | H04N 9/3185 |
| 2022/0239871 A1* | 7/2022 | Hsien | G02B 7/40 |
| 2022/0295026 A1* | 9/2022 | Wu | H04N 9/3161 |
| 2022/0335869 A1* | 10/2022 | Kwak | G09G 3/035 |

FOREIGN PATENT DOCUMENTS

| | | |
|---|---|---|
| JP | 2015-103922 | 6/2015 |
| JP | 6176114 | 8/2017 |
| KR | 10-0710946 | 4/2007 |
| KR | 10-2009-0072038 | 7/2009 |
| KR | 10-2009-0090682 | 8/2009 |
| KR | 10-2010-0072670 | 7/2010 |
| KR | 10-1428064 | 8/2014 |
| KR | 10-2017-0044383 | 4/2017 |
| KR | 10-1989087 | 6/2019 |

OTHER PUBLICATIONS

Yoon et al., U.S. Appl. No. 17/183,808, filed Feb. 24, 2021, Allowed.

* cited by examiner

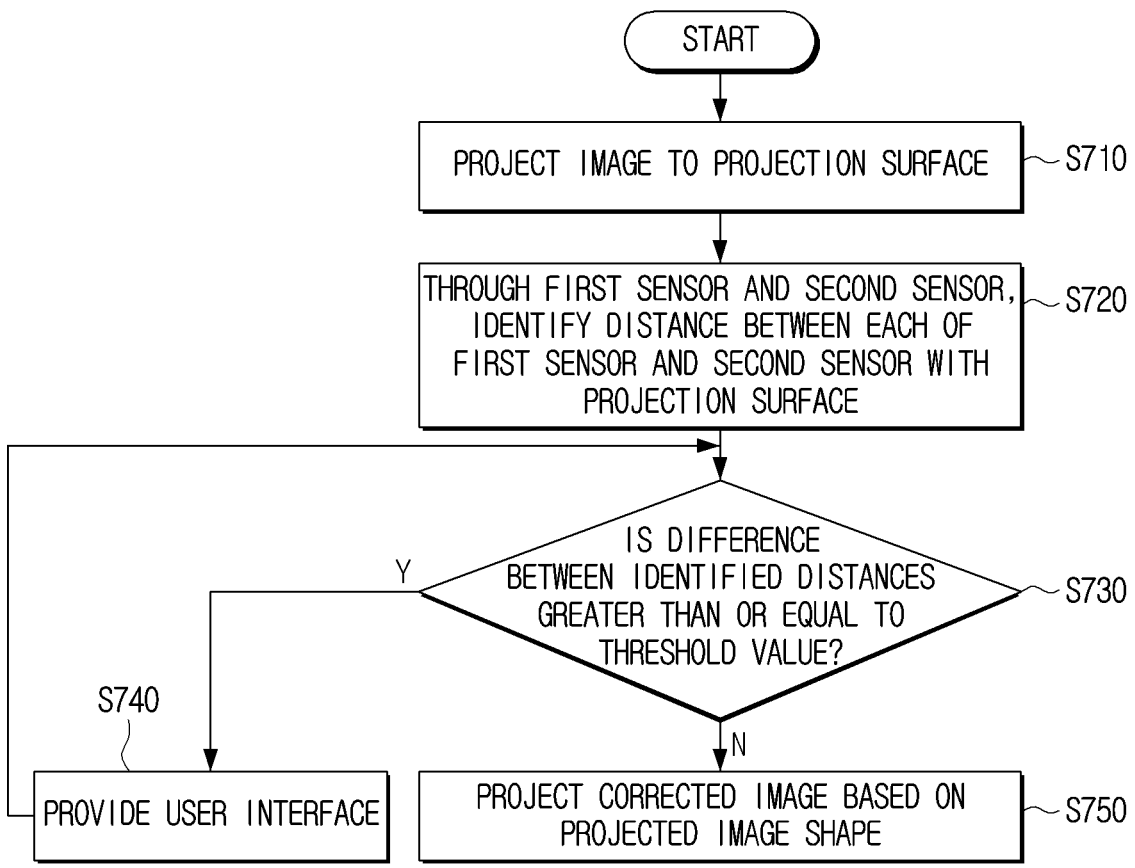

IMAGE PROJECTING APPARATUS AND CONTROLLING METHOD THEREOF

CROSS-REFERENCE TO RELATED APPLICATIONS

This application is a continuation of U.S. application Ser. No. 17/183,808, filed Feb. 24, 2021, now U.S. Pat. No. 11,336,878, which is based on and claims priority under 35 U.S.C. § 119 to Korean patent application number 10-2020-0040282, filed on Apr. 2, 2020, in the Korean Intellectual Property Office. The disclosures of each of these applications are incorporated by reference herein in their entireties.

BACKGROUND

1. Field

The disclosure relates to an image projecting apparatus. More particularly, the disclosure relates to an image projecting apparatus which corrects a projected image by using a plurality of proximity sensors and a camera.

2. Description of Related Art

In the field of beam projector products, an ultra short throw image projecting apparatus, which is different from a long throw image projecting apparatus according to the related art, is receiving much attention.

The ultra short throw image projecting apparatus may be a projector which is very close in distance (e.g., within 50 cm) between a screen and a projector In the image projected through the image projecting apparatus, keystones of various shapes may occur according to an installation environment. However, there are not many technologies which cause the image correcting apparatus to automatically correct the keystones.

Specifically, in the case of an ultra short throw image projecting apparatus in which a distance between the image being projected and the projecting apparatus is very short, means for automatically correcting the keystone is practically non-existent.

SUMMARY

The disclosure provide an image projecting apparatus capable of automatically correcting keystone by using a proximate sensor and a camera.

Specifically, the disclosure provides an image projecting apparatus capable of effectively correcting a projected image even if a distance between the image projecting apparatus and a projection surface is very close.

According to an embodiment, the image projecting apparatus includes an optical output unit configured to project an image, a camera, a plurality of sensors, and a processor configured to identify, based on sensing data received through the plurality of sensors, a distance between each of the plurality of sensors and a projection surface, provide, based on a difference between the identified distances being greater than or equal to a pre-set threshold value, a user interface configured to guide a direction adjustment of the image projecting apparatus, and identify, based on a difference between the identified distances being less than the pre-set threshold value, a shape of a projected image by photographing an image projected to the projection surface through the camera, and control the optical output unit to project an image corrected based on the identified shape.

The plurality of sensors may include a first sensor and a second sensor which are spaced apart from each other in a horizontal direction on the image projecting apparatus, and the processor may be configured to identify, through the first sensor, a first distance between the first sensor and the projection surface, and identify, through the second sensor, a second distance between the second sensor and the projection surface.

The processor may be configured to identify, based on a difference between the first distance and the second distance being greater than or equal to a pre-set threshold value, a rotation direction of the image projecting apparatus based on the difference between the first distance and the second distance, and provide the user interface configured to guide the user to rotate the image projecting apparatus according to the identified rotation direction.

The processor may be configured to determine whether the identified shape is in compliance with a pre-set condition, and control, based on the identified shape not being in compliance with the pre-set condition, the optical output unit to project the corrected image.

The processor may be configured to determine whether the identified shape is in compliance with the pre-set condition based on at least one from among whether a top side and a bottom side of the identified shape is in parallel, a length difference of a left side and a right side of the identified shape, and a gradient of each of the left side and the right side.

The image projecting apparatus may be an ultra short throw projector.

According to an embodiment, a control method of an image projecting apparatus including projecting an image to a projection surface, identifying, based on sensing data received through a plurality of sensors, a distance between each of the plurality of sensors and the projection surface, providing, based on a difference between the identified distances being greater than or equal to a pre-set threshold value, a user interface configured to guide a direction adjustment of the image projecting apparatus, and identifying, based on a difference between the identified distances being less than the pre-set threshold value, a shape of the projected image by photographing image projected to the surface of the projection surface through the camera, and projecting a corrected image to the projection surface based on the identified shape.

The plurality of sensors may include a first sensor and a second sensor which are spaced apart from each other in a horizontal direction on the image projecting apparatus. The identifying the distance includes identifying, through the first sensor, a first distance between the first sensor and the projection surface, and identifying, through the second sensor, a second distance between the second sensor and the projection surface.

The providing the user interface may include identifying, based on a difference between the first distance and the second distance being greater than or equal to the pre-set threshold value, a rotation direction of the image projecting apparatus based on a difference between the first distance and the second distance. Then, the user interface configured to guide the user to rotate the image projecting apparatus according to the identified rotation direction may be provided.

The control method may further include determining whether the identified shape is in compliance with a pre-set condition. The projecting the corrected image may include projecting, based on the identified shape not being in compliance with the pre-set condition, the corrected image.

The determining may include determining whether the identified shape is in compliance with the pre-set condition based on at least one from among whether a top side and a bottom side of the identified shape is in parallel, a length difference of a left side and a right side of the identified shape, and a gradient of each of the left side and the right side.

The image projecting apparatus of the disclosure may have an effect of providing, using the plurality of sensors, a user interface configured to guide the user to install an apparatus to be in parallel with the projection surface.

In addition, the image projecting apparatus of the disclosure may be advantageous for being usable in image correction by photographing a proximate projected image using a wide-angle camera, even if the image is projected close to the projection surface as an ultra short throw projector.

Accordingly, even without having to use a separate another apparatus, the projected image may be identified and analyzed to solve keystone in the projected image.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is an algorithm illustrating an example of a control method operating based on a difference between each of a plurality of sensors and distances between projection surfaces.

DETAILED DESCRIPTION

Figure 1:
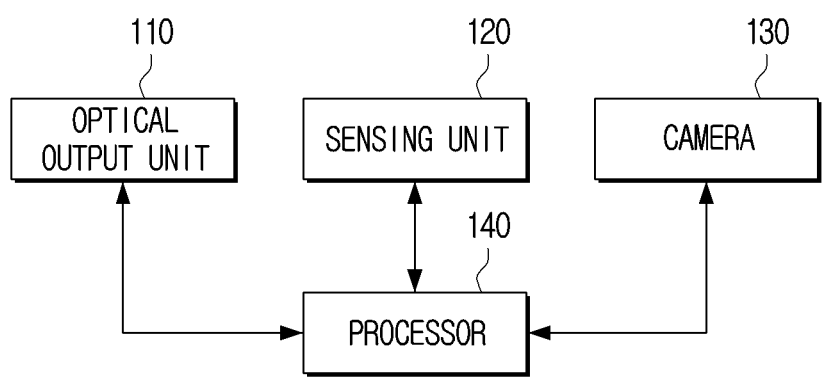
FIG. 1 is a block diagram illustrating a configuration of an image projecting apparatus according to an embodiment.

Prior to describing the disclosure in detail, a description method of the specification and drawings will be described.

First, terms used in the specification and the claims are general terms identified in consideration of the functions in the various embodiments of the disclosure. However, these terms may vary depending on intention, legal or technical interpretation, emergence of new technologies, and the like of those skilled in the related art. Also, there may be some terms arbitrarily identified by an applicant. With respect to these terms, the meaning thereof may be interpreted to a meaning defined in the description part of the disclosure, and the terms used herein may be construed based on the overall content of the disclosure and based on the technical common sense of those skilled in the related art, unless otherwise specified.

In addition, like reference numerals or symbols disclosed herein indicate like components or elements that perform substantially the same functions throughout the specification. For convenience of description and understanding, the same reference numerals or symbols are used and described in different embodiments from one another. In other words, although elements having the same reference numerals are all illustrated in a plurality of drawings, the plurality of drawings do not mean one embodiment.

In addition, in the disclosure, the terms including ordinal numbers such as "first," "second," and so on may be used to differentiate between elements. The ordinal numbers may be used to differentiate same or like elements from one another, and meaning of the terms should not be limited by the use of these ordinal numbers. The terms are used only for the purpose of distinguishing one element from another. In an example, the elements associated with the ordinal numbers should not be limited in the order of use or the order of arrangement by the numbers. If necessary, each of the ordinal numbers may be used replaced with each other.

A singular expression includes a plural expression, unless otherwise specified. It is to be understood that the terms such as "comprise" or "include" are used herein to designate a presence of a characteristic, a number, a step, an operation, an element, a component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual specific hardware, the elements may be integrated in at least one module or chip and implemented in at least one processor.

In addition, when a certain part described as being connected to another part, this includes not only a direct connection, but also an indirect connection through another medium. Further, when a certain part is described as including a certain element, unless specified to the contrary, this means that another element may be further included, rather than precluding another element.

In an embodiment of the disclosure, the meaning of "at least one of configuration 1, configuration 2 or configuration 3" may include all cases of "only configuration 1," "only configuration 2," "only configuration 3," "configuration 1 and configuration 2," "configuration 2 and configuration 3," "configuration 1 and configuration 3," and "configuration 1, configuration 2 and configuration 3."

FIG. 1 is a block diagram illustrating a configuration of an image projecting apparatus according to an embodiment.

Referring to FIG. 1, the image projecting apparatus 100 may include an optical output unit 110, a sensing unit 120, a camera 130, and a processor 140.

The image projecting apparatus 100 may be implemented as a projector. Specifically, the image projecting apparatus 100 may be implemented as a long throw projector, a short throw projector, or the like, and may also be implemented as an ultra short throw projector.

The optical output unit 110 may be a configuration for projecting an image. The optical output unit 110 may output light corresponding to an image to at least one projection surface located at a front surface of the image projecting apparatus 100.

The optical output unit 110 may include a lens and a mirror. The size of an image projected to the projection surface located at an angular distance from the optical output unit 110 may be pre-set based on a distance between the lens and the mirror.

The sensing unit 120 may be a configuration for measuring a distance between the image projecting apparatus 100 and the projection surface.

The sensing unit 120 may include a plurality of sensors. The plurality of sensors may each correspond to an ultrasonic sensor, a proximate sensor, a time-of-flight (TOF) sensor, or the like. The each of the plurality of sensors may obtain sensing data on a distance between each of the plurality of sensors and the projection surface.

For example, each sensing unit 120 may include a first sensor and a second sensor corresponding to a proximate sensor. The first sensor may obtain sensing data on a distance between the first sensor and the projection surface, and the second sensor may obtain sensing data on a distance between the second sensor and the projection surface.

The sensing unit 120 may include sensors of various types in addition to the above-described sensor, which will be described below through FIG. 5.

The camera 130 may be a configuration for obtaining an image on at least one object outside the image projecting apparatus 100. For example, the camera 130 may photograph an image which is projected to the projection surface by the optical output unit 110.

The camera 130 may be implemented as a wide-angle camera capable of photographing a wide-angle of 160° or more. Based on the image projecting apparatus 100 being implemented as an ultra short throw projector capable of projecting an image at a very close distance with the projection surface, the whole image projected through the camera 130 which is implemented as a wide-angle camera may be concurrently photographed.

The processor 140 may be a configuration for controlling the overall operation of the image projecting apparatus 100.

The processor 140 may be implemented as a generic purpose processor such as a central processing unit (CPU) and an application processor (AP), a graphics dedicated processor such as a vision processing unit (VPU), an artificial intelligence dedicated processor such as a neural processing unit (NPU), or the like. In addition, the processor 140 may include a volatile memory such as a static random access memory (SRAM).

The processor 140 may be configured to execute one or more instructions stored in the memory of the image projecting apparatus 100 to control one or more elements included in the image projecting apparatus 100, control one or more elements as a hardware circuitry or a chip, or control one or more elements as a combination of a software and a hardware.

The image projecting apparatus 100 may project an image according to various conditions.

In an example, the processor 140 may be configured to control the optical output unit 110 to project an image according to an input user command.

In another example, the processor 140 may be configured to identify, based on sensing data received through the at least one sensor included in the sensing unit 120, whether or not the projection surface is proximate to the image projecting apparatus 100. Based on the projection surface being proximate to the image projecting apparatus 100 by within a predetermined distance, the processor 140 may be configured to control the optical output unit 110 to project an image.

Based on an installation environment of the projection surface and/or the image projecting apparatus 100, problems such as keystone or the like may be generated in the projected image.

The embodiments of the image projecting apparatus 100 according to the disclosure solving keystone will be described in detail below.

The processor 140 according to an embodiment of the disclosure may be configured to identify, based on sensing data received through the plurality of sensors, the distance between the each of the plurality of sensors and the projection surface.

Figure 2:
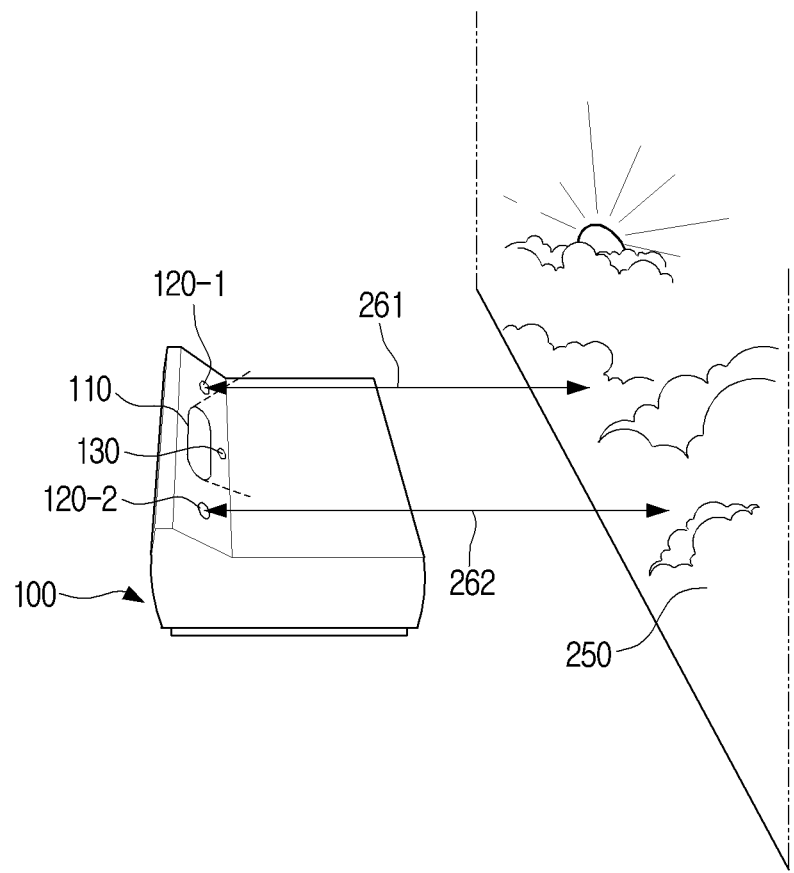
FIG. 2 is a diagram illustrating an example of an image projecting apparatus measuring a distance between each of a plurality of sensors and a projection surface.

In this respect, FIG. 2 is a diagram illustrating an example of an image projecting apparatus measuring a distance between each of a plurality of sensors and a projection surface.

Referring to FIG. 2, the image projection apparatus 100 may include a first proximate sensor 120-1 and a second proximate sensor 120-2 which are spaced apart from each other in a horizontal direction on the image projecting apparatus 100.

Specifically, based on the premise of the image projecting apparatus 100 being horizontally laid on a floor surface, a front direction of the image projecting apparatus 100 may be defined as an x-axis direction, a side direction as a y-axis direction, and a direction perpendicular from the floor surface as a z-axis. At this time, the first proximate sensor 120-1 and the second proximate sensor 120-2 may be spaced apart from each other in the y-axis direction.

However, the location and the direction of the sensors are not limited to FIG. 2, and may be modified according to persons skilled in the art based on the premise of being capable of performing the operations according to the embodiments of the disclosure.

Referring to FIG. 2, the processor 140 may be configured to identify a first distance 261 between the projection surface 250 and the first proximate sensor 120-1 located at the front of the image projecting apparatus 100 through the first proximate sensor 120-1.

Specifically, the processor 140 may be configured to identify the first distance 261 between the first proximate sensor 120-1 and the projection surface 250 based on the first proximate sensor 120-1 outputting infrared rays, or the like in one direction.

In addition, the processor 140 may be configured to identify a second distance 262 between the projection surface 250 and the second proximate sensor 120-2 through the second proximate sensor 120-2.

The second proximate sensor 120-2 may output infrared rays, or the like in a direction parallel with the corresponding direction which the first proximate sensor 120-1 outputs infrared rays, or the like.

That is, the processor 140 may be configured to identify the second distance 262 between the second proximate sensor 120-2 and the projection surface 250 based on the direction parallel with the corresponding direction which is a standard of distance between the first proximate sensor 120-1 and the projection surface 250.

Then, the processor 140 may be configured to determine the difference distance between the identified distances. As a specific example, the processor 140 may be configured to identify the difference between the above described first distance 261 and the above-described second distance 262.

The processor 140 may be configured to provide a user interface for guiding a direction adjustment of the image projecting apparatus 100 based on the difference between the identified distances.

The user interface may guide a rotation direction of the image projecting apparatus 100. The rotation direction may refer to rotating based on the z-axis from among the above-described x-axis, the y-axis and the z-axis.

Figure 3:
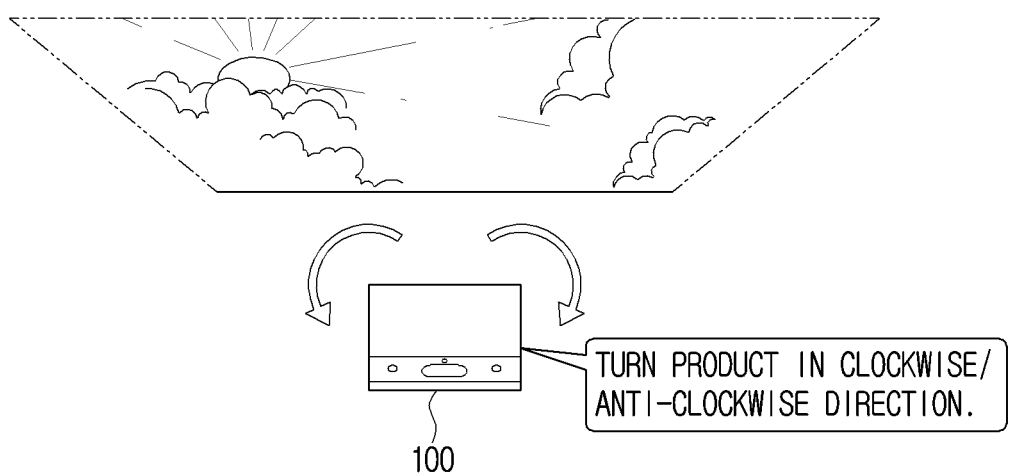
FIG. 3 is a diagram illustrating an example of an image projecting apparatus providing a user interface based on a difference between measured distances.

In this respect, FIG. 3 is a diagram illustrating an example of an image projecting apparatus providing a user interface based on a difference between measured distances.

In FIG. 2, based on the difference between the first distance 261 and the second distance 262 being the same or less than a pre-set threshold value, the processor 140 may not provide any user interface.

On the other hand, based on the difference between the first distance 261 and the second distance 262 being greater than or equal to a pre-set threshold value, the processor 140 may be configured to identify the rotation direction of the image projecting apparatus 100 based on the difference between the first distance 261 and the second distance 262. Then, the processor 140 may be configured to provide the user interface for guiding a user to rotate the image projecting apparatus 100 according to the identified rotation direction.

Referring to FIG. 3, based on the first distance 261 being greater than the second distance 262 in FIG. 2, the processor 140 may be configured to provide a user interface guiding the direction adjustment of the image projecting apparatus 100 such as "please turn the product in a clockwise direction." The user interface may be visually provided through a display of the image projecting apparatus 100 or audibly provided through a speaker of the image projecting apparatus 100.

Referring to FIG. 3, based on the first distance 261 being smaller than the second distance 262 in FIG. 2, the processor 140 may be configured to provide a user interface such as "please turn the product in an anti-clockwise direction."

The processor 140 may be configured to photograph the projection surface through the camera 130. Specifically, the processor 140 may be configured to photograph the image projected on the projection surface through the optical output unit 110. As a specific example, the processor 140 may be configured to photograph an (projected) image through the camera 130 installed at the front of the image projecting apparatus 100 as in FIG. 2.

In this case, the processor 140 may be configured to identify, based on the image photographed through the camera 130, the shape of the image projected to the projection surface.

The processor 140 may be configured to divide, within the projection surface photographed through the camera 130, an area not projected with an image and an area projected with an image. Then, the processor 140 may be configured to identify the shape of the area projected with the image as the shape of the projected image.

The processor 140 may use at least one algorithm for dividing an area projected with an image and an area not projected with an image based on a degree of color change between pixels adjacent to one another. Alternatively, the processor 140 may use a separate artificial intelligence model trained to differentiate an area not projected with an image and an area projected with an image within an input image. Alternatively, the processor 140 may be configured to determine a part with a relatively bright brightness within the photographed image as the area projected with an image.

Then, the processor 140 may be configured to control the optical output unit 110 to project a corrected image based on the identified shape.

The processor 140 may be configured to control, based on the difference between the distances (e.g., first distance 261 and second distance 262) identified through FIG. 2 or the like being less than a pre-set threshold value, the optical output unit 110 to project the corrected image based on the shape of the projected image photographed through the camera 130.

That is, the processor 140 may be configured to provide, based on the difference between the identified distances being greater than or equal to a pre-set threshold value, the user interface which causes the user to rotate the image projecting apparatus 100, while automatically solve, based on the difference between the identified distances being less than a pre-set threshold value, keystones or the like of the projected image by using the camera 130.

Figure 4A:
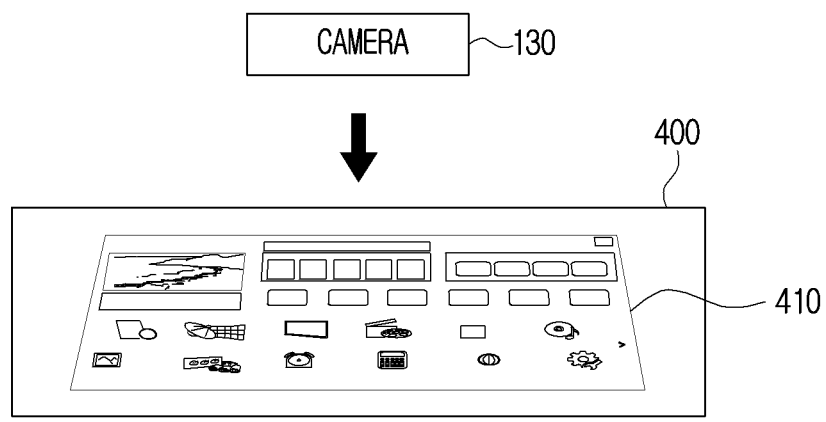
FIG. 4A is a diagram illustrating an example of an image projecting apparatus installed to be proximate with a projection surface photographing a projected image through a camera.

In this respect, FIG. 4A is a diagram illustrating an example of an image projecting apparatus installed to be proximate with a projection surface photographing a projected image through a camera. FIG. 4A is based on a premise of the image projecting apparatus 100 being implemented as an ultra short throw projector.

Referring to FIG. 4A, even if the image projected by the optical output unit 110 corresponds to the original rectangle shape, the shape of the projected image 410 included in the image 400 photographed through the camera 130, which is a wide-angle camera, may not be a rectangle shape.

This is because, based on the image projecting apparatus 100 being an ultra short throw projector very close to the projection surface as in FIG. 2, the camera 130 typically photographs the projected image from the bottom to the top. As a result, the shape of the projected image 410 photographed through the camera 130 may be a shape similar to a trapezoid.

Figure 4B:
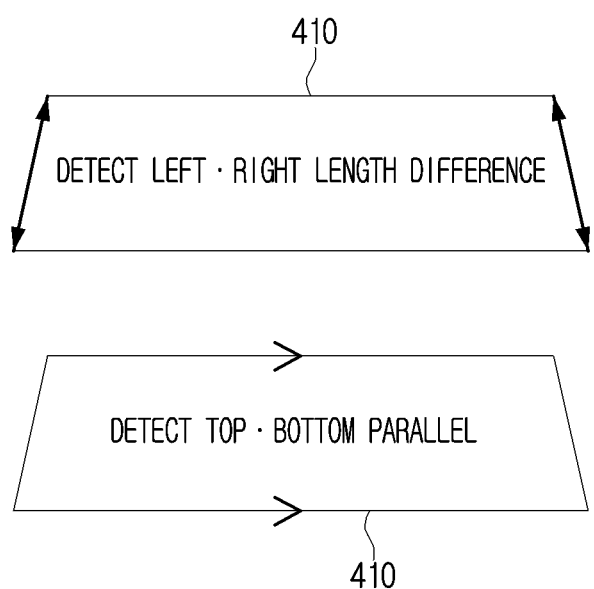
FIG. 4B is a diagram illustrating an example of an image projecting apparatus determining whether or not to correct an image based on a shape of a photographed projected image.

FIG. 4B is a diagram illustrating an example of an image projecting apparatus determining whether or not to correct an image based on a shape of a photographed projected image.

The processor 140 may be configured to determine whether the identified shape is in compliance with a pre-set condition.

Referring to FIG. 4B, the processor 140 may be configured to identify whether a top side and a bottom side of the identified shape 410 is in parallel, difference in length of a left side and a right side of the identified shape 410, or the like. The processor 140 may be configured to determine the identified shape 410 as being in compliance with the pre-set condition only when the top side and the bottom side are in parallel with each other and there is no difference in the left side length and the right side length.

In addition, the processor 140 may be configured to determine whether the identified shape 410 is in compliance with the pre-set condition based on at least one from among the gradients of each of the left side and the right side. Specifically, the processor 140 may be configured to determine the identified shape 410 as being in compliance with the pre-set condition only when the angles (internal angle) of the left side and the right side with respect to the bottom side are the same with each other.

Further, the processor 140 may be configured to determine the identified shape 410 as being in compliance with the pre-set condition only when each of the top side and the bottom side corresponds to an exact horizontal direction in the image photographed through the camera 130.

Accordingly, the pre-set condition may correspond to when the identified shaped is substantially a trapezoid. That is, based on the identified shape being substantially a trapezoid, the processor 140 may be configured to identify the identified shape as being in compliance with the pre-set condition. On the other hand, based on the identified shape not being substantially a trapezoid, the processor 140 may be configured to identify the identified shape as not being in compliance with the pre-set condition.

Based on the identified shape being in compliance with the pre-set condition, the optical output unit 110 may continue to project the image previously projected without performing a separate correction on the image to be projected.

On the other hand, based on the identified shape not being in compliance with the pre-set condition, the processor 140 may be configured to control the optical output unit 110 to project the corrected image rather than the previously projected image.

As a specific example, based on the optical output unit projecting an image corresponding to a specific image data, the processor 140 may correct the corresponding image data so that the projected image becomes substantially a trapezoid shape. Then, the processor 140 may be configured to control the optical output unit 110 for an image corresponding to the corrected image data to be projected The image projecting apparatus 100 of the disclosure may, taking into consideration the feature of the ultra short throw projector, have an effect of automatically correcting an image so that the shape of the projected image photographed through the camera 130 becomes substantially a trapezoid. Accordingly, the user may experience a projected image of a substantially rectangular shape.

The processor 140 may be configured to photograph, after the corrected image is projected, the projection surface again through the camera 130. In this case, the processor 140 may be configured to determine whether to correct the image again or the like based on whether the shape of the projected (corrected) image is in compliance with the pre-set condition.

Accordingly, the processor 140 may be configured to project an image by correcting until the shape of the projected image is in compliance with the pre-set condition.

In the above-described embodiments, the processor 140 may be configured to identify the distance between the first proximate sensor 120-1 and each of the second proximate sensors 120-2 with the projection surface, and the operation determining/guiding whether the direction adjustment of the image projecting apparatus 100 is necessary and the operation of the processor 140 identifying the shape of the image projected to the projection surface through the camera 130 may be carried out at various times.

For example, the above-described operations may be performed each time the power of the image projecting apparatus 100 is turned-on and the image is projected through the optical output unit 110.

Alternatively, the above-described operations may be continuously performed according to a predetermined period from after the projection of the image is started until after the projection of the image is ended.

Alternatively, the above-described operations may be performed at a time at which the movement of the position or the direction of the image projecting apparatus 100 is detected, or at a time at which movement of the image projecting apparatus 100 by an external impact or the like is detected. In this case, the image projecting apparatus 100 may include one or more sensors such as an acceleration sensor, a gyro sensor, and the like for detecting location, detecting position or direction, or detecting external impact or movement.

Figure 5:
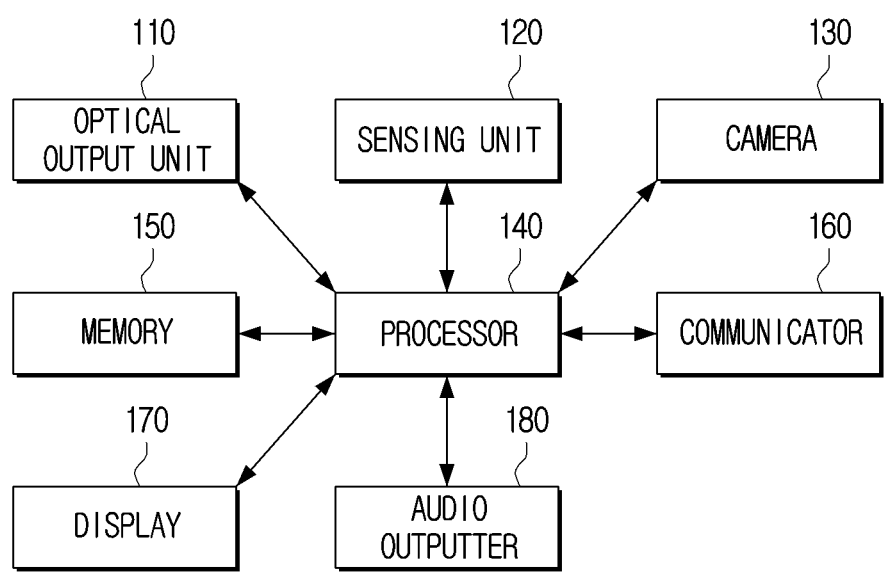
FIG. 5 is a block diagram illustrating a detailed configuration of an image projecting apparatus according to various embodiments.

FIG. 5 is a block diagram illustrating a detailed configuration of an image projecting apparatus according to various embodiments.

Referring to FIG. 5, the image projecting apparatus 100 may further include a memory 150, a communicator 160, a display 170, an audio outputter 180, or the like in addition to the optical output unit 110, the sensing unit 120, the camera 130, and the processor 140.

The sensing unit 120 may include various sensors in addition to the above-described sensors to measure the distance from the projection surface.

For example, the sensing unit 120 may include a gyro sensor, an acceleration sensor, a geomagnetic sensor, or the like capable of indicating a rotation angle of the image projecting apparatus 100.

The embodiments described above through the drawings above are embodiments of the processor 140 providing the user interface or projecting the corrected image based on the difference between the distances identified through the plurality of proximate sensors.

However, the processor 140 may also be configured to provide the user interface or project the corrected image based on an image photographed through the camera 130.

For example, if an angle difference of the left side and the right side of the image shape identified (projected) through the camera 130 is greater than or equal to a pre-set angle, the processor 140 may be configured to provide the user interface according to the distance difference measured based on the plurality of proximate sensors. On the other hand, if the angle difference of the left side and the right side in the image shape identified (projected) through the camera 130 is (greater than 0) less than the pre-set angle, the processor 140 may be configured to control the optical output unit 110 to project the corrected image.

In another example, if any one from among the condition of the top side and the bottom side being parallel and the condition of the left side and the right side being the same in the identified (projected) image shape is not satisfied, the processor 140 may be configured to provide the user interface according to the distance difference measured based on the plurality of proximate sensors. If only one condition is satisfied, the processor 140 may be configured to control the optical output unit 110 to project the corrected image.

The memory 150 may be configured to store various data, program or application which drives and controls the image projecting apparatus 100.

For example, the memory 150 store information on a size and a form of a reference image. The memory 150 may include at least one from among a volatile memory such as a dynamic RAM (DRAM), a static RAM (SRAM), and a synchronous dynamic RAM (SDRAM), or a non-volatile memory such as a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, and a NOR flash memory.

The communicator 160 may be means for performing data communication with an external apparatus (not shown) via wireless or wired communication. The processor 140 may be configured to perform communication with various external devices by using the communicator 160.

When performing data communication with an external apparatus through a wireless communication method, the communicator 160 may include at least one from among a WIFI DIRECT communication module, a Bluetooth module, an infrared data association (IrDA) module, a Near Field Communication (NFC) module, a ZigBee module, a cellular communication module, a 3rd generation (3G) mobile communication module, a 4th generation (4G) communication module, a 4G long term evolution (LTE) communication module, or a 5th generation (5G) mobile communication module.

When performing data communication with the external apparatus through a wired communication method, the communicator 160 may be connected to a coaxial cable, an optical fiber cable, or the like and may transmit and receive various data by performing a local area network (LAN) communication.

The processor 140 may be configured to control the optical output unit 110 to project an image corresponding to the image data received through the communicator 160.

The display 170 may be a configuration for displaying one or more images according to the control of the processor 140.

The processor 140 may be configured to control the display 170 to visually provide the above-described user interface.

The audio outputter 170 may be a configuration for outputting various audio signals according to the control of the processor 140.

The processor 140 may be configured to control the audio outputter 170 to visually provide the above-described user interface.

The image projecting apparatus 100 may further include a user inputter, or the like for receiving input of a user command in addition to the above-described configurations. In this case, the processor 140 may be configured to perform, based on the user command input through the user inputter, at least one from among the above-described operations.

Through FIGS. 6 to 7 below, a control method of the image projecting apparatus according to the disclosure will be described.

Figure 6:
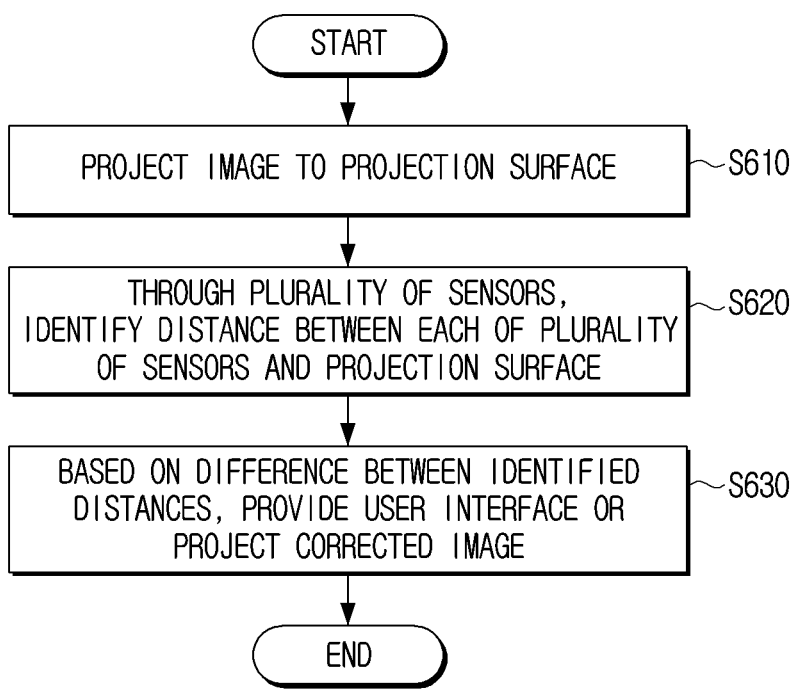
FIG. 6 is a flowchart illustrating a control method of an image projecting apparatus according to an embodiment.

FIG. 6 is a flowchart illustrating a control method of an image projecting apparatus according to an embodiment.

Referring to FIG. 6, the control method may project an image to the projection surface (S610). Specifically, an image corresponding to image data may be projected to at least one projection surface through the optical output unit, or the like.

Then, based on the sensing data received through the plurality of sensors, the distance between each of the plurality of sensors and the projection surface may be identified (S620).

The plurality of sensors may include a first proximate sensor and a second proximate sensor which are spaced apart from each other in a horizontal direction on the image projecting apparatus.

Then, based on the difference between the identified distances, the user interface may be provided or the corrected image may be projected (S630).

The user interface may be for guiding the user to rotate the image projecting apparatus in a specific rotation direction.

As a specific example, the operation of projecting the corrected image may refer to correcting the image data until the image being projected becomes substantially a trapezoid, and projecting an image corresponding to the corrected image data.

In this respect, FIG. 7 is an algorithm illustrating an example of a control method operating based on a difference between each of a plurality of sensors and distances between projection surfaces.

Referring to FIG. 7, after the image is projected (S710), the first distance between the first proximate sensor and the projection surface and the second distance between the second proximate sensor and the projection surface may each be identified (S720).

Here, the first distance between the first proximate sensor and the project surface based on one direction may be identified through the first proximate sensor, and the second distance between the second proximate sensor and the projection surface based on a direction parallel with the above-described one direction may be identified through the second proximate sensor.

Then, whether the difference between the identified distances is greater than or equal to a pre-set threshold value may be identified (S730).

If the difference between the identified distances is greater than or equal to the pre-set threshold value (S730—Y), the user interface for guiding the direction adjustment of the image projecting apparatus may be provided (S740).

Here, a user interface for identifying the rotation direction to cause the difference between the first distance and the second distance to reduce, and a user interface for guiding the user to rotate the image projecting apparatus according to the identified rotation direction may be provided.

On the other hand, based on the difference between the identified distances being less than the pre-set threshold value (S730—N), the shape of the projected image by photographing the image projected to the projection surface through the camera may be identified. Meanwhile, referring to FIG. 7, in the case of the difference between the identified distances being less than the pre-set threshold value (S730—N), although initially the difference between the identified distances was greater than or equal to the pre-set threshold value, the case of the difference between the identified distances being less than the pre-set threshold value may be included as a result of the user rotating the image projecting apparatus after the user interface is provided (S730—Y->S740->S730—N).

Then, the image corrected based on the identified shape may be projected to the projection surface (S750).

At this time, whether the identified shape is in compliance with the pre-set condition may be determined. Specifically, whether the identified shape is in compliance with the pre-set condition may be determined based on at least one from among whether the top side and the bottom side of the identified shape is in parallel, the length difference of the left side and the right side of the identified shape, and the gradient of each of the left side and the right side.

Based on the identified shape not being in compliance with the pre-set condition, the corrected image may be projected. On the other hand, based on the identified shape being in compliance with the pre-set condition, the previously projected image may continue to be projected.

As a specific example, the image may be corrected so that the shape of the projected image becomes substantially a trapezoid (e.g., pre-set condition) and projected.

However, based on the identified shape satisfying the pre-set condition (e.g., substantially a trapezoid), a separate correction on the image being projected may not be performed.

The control method described through FIGS. 6 to 7 may be performed through the image projecting apparatus 100 illustrated and described through FIGS. 2 and 5. Alternatively, the control method described through FIGS. 6 to 7 may be implemented by the image projecting apparatus 100 and a system including at least one external device.

The various embodiments described above may be implemented in a recordable medium which is readable by a computer or a device similar to the computer using a software, a hardware, or a combination of the software and the hardware.

According to a hardware implementation, the embodiments described in the disclosure may be implemented by using at least one from among Application Specific Integrated Circuits (ASICs), digital signal processors (DSPs), digital signal processing devices (DSPDs), Programmable logic devices (PLDs), field programmable gate arrays (FPGAs), a processor, a controller, micro-controllers, a microprocessor, and an electrical unit for performing other functions.

In some cases, embodiments described herein may be implemented by the processor 140 itself. According to a software implementation, embodiments such as the procedures and functions described herein may be implemented with separate software modules. Each of the software modules may perform one or more of the functions and operations described herein.

The computer instructions for performing the processing operations in the image projecting apparatus 100 according to the various embodiments described above may be stored in a non-transitory computer-readable medium. The computer instructions stored in this non-transitory computer-readable medium may cause a specific device to perform the processing operations in the image projecting apparatus 100 according to the above-described various embodiments when executed by the processor of the specific device.

The non-transitory computer readable medium may refer to a medium that stores data semi-permanently rather than storing data for a very short time, such as a register, a cache, a memory, or the like, and is readable by a device. Specifically, the various applications or programs described above may be stored and provided in a non-transitory computer readable medium such as, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. An image projecting apparatus, comprising:
an optical output unit comprising circuitry;
a camera;
a plurality of sensors; and
a processor configured to:
based on data obtained through the plurality of sensors, obtain a distance between each of the plurality of sensors and a projection surface on which an output image output by the optical output unit is projected;
obtain, using the camera, an image corresponding to the projection surface;
based on the obtained distances and information on an object obtained based on the obtained image, process the output image, the object corresponding to the output image projected on the projection surface; and
control the optical output unit to project the processed image,
wherein the processor is configured to, based on a difference between the obtained distances and a predetermined value, identify a shape of the object, and process the output image based on the identified shape.

2. The image projecting apparatus of claim 1, wherein the information on the object includes the shape of the object.

3. The image projecting apparatus of claim 1, wherein the processor is configured to, based on the difference between the obtained distances and a predetermined value, provide a user interface to guide an adjustment corresponding to a location of the image projecting apparatus.

4. The image projecting apparatus of claim 3, wherein the plurality of sensors includes a first sensor and a second sensor spaced apart from each other in a horizontal direction on the image projecting apparatus,
wherein the processor is configured to:
obtain, through the first sensor, a first distance between the first sensor and the projection surface, and
obtain, through the second sensor, a second distance between the second sensor and the projection surface.

5. The image projecting apparatus of claim 4, wherein the processor is configured to:
identify, based on a difference between the first distance and the second distance being greater than or equal to a predetermined value, a rotation direction of the image projecting apparatus based on the difference between the first distance and the second distance, and
provide a user interface to guide the user to rotate the image projecting apparatus based on the identified rotation direction.

6. The image projecting apparatus of claim 1, wherein the processor is configured to:
identify whether the identified shape corresponds to a predetermined condition; and
based on the identified shape not corresponding to the predetermined condition, control the optical output unit to project the processed image.

7. The image projecting apparatus of claim 6, wherein the processor is configured to identify whether the identified shape corresponds to the predetermined condition based on at least one of whether a top side and a bottom side of the identified shape is in parallel, a length difference of a left side and a right side of the identified shape, and a gradient of each of the left side and the right side.

8. The image projecting apparatus of claim 1, wherein the image projecting apparatus includes an ultra short throw projector.

9. A method of controlling an image projecting apparatus, comprising:
projecting an output image;
based on data obtained through a plurality of sensors, obtaining a distance between each of the plurality of sensors and a projection surface on which the output image is projected;
obtaining, using a camera, an image corresponding to the projection surface;
based on the obtained distances and information on an object obtained based on the obtained image, processing the output image, the object corresponding to the output image projected on the projection surface; and
projecting the processed image,
wherein the processing comprises, based on a difference between the obtained distances and a predetermined value, identifying a shape of the object, and processing the output image based on the identified shape.

10. The method of claim 9, wherein the information on the object includes the shape of the object.

11. The method of claim 9, further comprising:
based on the difference between the obtained distances and a predetermined value, providing a user interface to guide an adjustment corresponding to a location of the image projecting apparatus.

12. The method of claim 11, wherein the plurality of sensors includes a first sensor and a second sensor spaced apart from each other in a horizontal direction on the image projecting apparatus,
wherein the obtaining the distance comprises:
obtaining, through the first sensor, a first distance between the first sensor and the projection surface; and
obtaining, through the second sensor, a second distance between the second sensor and the projection surface.

13. The method of claim 12, further comprises:
identifying, based on a difference between the first distance and the second distance being greater than or equal to a predetermined value, a rotation direction of the image projecting apparatus based on the difference between the first distance and the second distance; and
providing a user interface to guide the user to rotate the image projecting apparatus based on the identified rotation direction.

14. The method of claim 9, further comprising:
identifying whether the identified shape corresponds to a predetermined condition,
wherein the projecting the processed image comprises, based on the identified shape not corresponding to the predetermined condition, projecting the processed image.

15. The method of claim 14, wherein the identifying comprises identifying whether the identified shape corresponds to the predetermined condition based on at least one of whether a top side and a bottom side of the identified shape is in parallel, a length difference of a left side and a right side of the identified shape, and a gradient of each of the left side and the right side.

16. The method of claim 9, wherein the image projecting apparatus includes an ultra short throw projector.

* * * * *